United States Patent
Chen

(10) Patent No.: US 6,615,690 B2
(45) Date of Patent: Sep. 9, 2003

(54) TURNING DISC INTERMITTENT ROTARY MECHANISM

(76) Inventor: Chau-Tsung Chen, 4F, No. 263, Minan W. Rd., Hsinhuang, Taipei Hsien (TW)

(*) Notice: Subject to any disclaimer, the term of this patent is extended or adjusted under 35 U.S.C. 154(b) by 0 days.

(21) Appl. No.: 09/844,900

(22) Filed: Apr. 26, 2001

(65) Prior Publication Data

US 2002/0157503 A1 Oct. 31, 2002

(51) Int. Cl.$^7$ ................................................ F16M 27/04
(52) U.S. Cl. ............................ 74/820; 74/84 R; 74/436
(58) Field of Search ........................ 74/436, 569, 570, 74/813 R, 820, 84 R

(56) References Cited

U.S. PATENT DOCUMENTS

| | | | | |
|---|---|---|---|---|
| 916,702 A | * | 3/1909 | Hartt | 74/569 |
| 3,153,952 A | * | 10/1964 | Thoma | 74/822 |
| 3,653,275 A | * | 4/1972 | Leacock | 74/436 |
| 3,827,312 A | * | 8/1974 | Bristol et al. | 74/436 |
| 3,835,723 A | * | 9/1974 | Zugel | 74/436 |
| 3,977,263 A | * | 8/1976 | Ara | 74/129 |
| 4,512,214 A | * | 4/1985 | Surman | 74/820 |
| 4,724,760 A | * | 2/1988 | Bubley | 101/115 |
| 5,176,036 A | * | 1/1993 | Harris | 74/24 |
| 5,321,988 A | * | 6/1994 | Folino | 74/25 |
| 5,768,757 A | * | 6/1998 | Link | 29/48.5 R |

FOREIGN PATENT DOCUMENTS

JP    57-76354    *   5/1982    ......... F16H/27/04

* cited by examiner

Primary Examiner—William C Joyce
Assistant Examiner—Timothy McAnulty
(74) Attorney, Agent, or Firm—Troxell Law Office PLLC

(57) ABSTRACT

The features of a turning disc intermittent rotary mechanism comprise at least one top disc, a through hole disposed at the center of the bottom disc plane, and the lateral side of the peripheral disc plane of the through hole is formed into a plurality of continuous plum blossom-patterned sliding slots; a bottom seat with its central convex section lively connected in the through hole, wherein a round through hole is mounted on the side of the bottom seat; a main driving wheel lively inserted in the round through hole, wherein a small pulley is mounted on the side of the top plane of the main driving wheel and slides inside the sliding slots; the rotation of the main driving wheel enables the small pulley to move inside the sliding slots and further drive the intermittent rotation and dwelling of the top disc, thereby to develop the turning disc in rotation to be designed, according to the need, into a process station with multi braking and dwelling points for providing multi-processing movements for the parts.

4 Claims, 14 Drawing Sheets

TURNING DISC INTERMITTENT ROTARY MECHANISM

BACKGROUND OF THE INVENTION

1) Field of the Invention

The present invention is to provide a turning disc for an intermittent rotary mechanism, more especially, a rotary station to be used for industrial automatic processing.

2) Description of the Prior Art

Both patents of Taiwan Official Publication No. 388469 of inscribed intermittent mechanism and Taiwan Official Publication No. 388470 of circumscribed intermittent mechanism have mentioned the intermittent moving disc mechanism for industrial purposes and both have used the conventional Geneva Mechanism; the Geneva Mechanism as shown in FIG. 8 comprises a main driving wheel (A), with a low circular sliding slot (A1) formed on the top peripheral side and a convex section (A2) mounted on the side end for lively connecting a small pulley (A3); a passive element (B) is disposed with four long narrow slots (B1) and four circularly arcuate walls (B2); when the main driving wheel (A) rotates, the small pulley (A3) slides into the long narrow slot (B1) and exerts the force to slide along the slot wall of the long narrow slot (B1) to make the passive element (B) rotate along with it (as shown in FIGS. 8A and B); when the small pulley (A3) leaves the long narrow slot (B1), the arcuate wall (B2) slides correspondingly to the sliding wall of the circular sliding slot (A1); since the radian of the arcuate wall (B2) is the same as that of the circular sliding slot (A1), the passive element (B) will not rotate (as shown in FIG. 8C), and at this time, the passive element (B) is in dwelling; therefore, the main driving wheel (A) continuously rotates and the passive element (B) continuously moves in intemittent rotation The working table (C) (as shown in FIG. 8D) for the object to be processed can be conjoined onto the top of the passive element (B); smelting tool (C1) can be mounted on top of the working table (C) while various objects to be processed can be firmly placed on the smelting tool (C1) for processing movements such as drilling the holes, tapping, printing the object with fonts and multicolors, filling and combining the capsule medicines, etc.

Another conventional intermittent moving disc mechanism for industrial purposes, referring to FIG. 9 of the bottom view of the plane drawing of a turning disc, comprises a top disc (E) with cruciform long sliding slots (E1) mounted on the bottom plane, wherein the central border place is formed as the arcuate walls (E3) and the arcuate walls (E2) are mounted on the periphery of the bottom plane of the top disc (E); a main transmission wheel (G) comprises a cylindrical convex axle section (G1) with a cam (H) fixedly connected thereon; the radian of the arcuate wall (H1) formed on the peripheral wall plane of the front end of the cam (H) is the same as that of the arcuate wall (E2), the other end of the cam (H) pivotally conjoins a small pulley (H2) which slides inside the cruciform long sliding slot (E1); the arcuate wall (H1) slides correspondingly to the arcuate wall (E2); when the main transmission wheel (G) rotates, if the small pulley (H2) slides on the arcuate wall (E3) while the arcuate wall (H1) and the arcuate wall (E2) slide correspondently to each other, then the top disc (E) is making an idle turning but not rotating, when the small pulley (H2) enters into the long sliding slot (E1), then the small pulley (H2) will transmit the moment of force inside the long sliding slot (E1) to squeeze, push and press the wall plane of the long sliding slot (E1), thereby to make the top disc (E) rotate.

However, after a long-term application, the said conventional disc disclosed above has the following shortcomings:

1. The smelting tool (C1) (where the object to be processed is placed) canit be directly erected on the passive element (B).
2. Only one but not a plurality of working tables (C) can be erected and which will tremendously reduce the efficiency of processing.
3. Since the long narrow slot (B1) of the passive element (B) can only be designed to be equally divided into four or six parts, in other words, only four or six times of braking or dwelling for processing, the number of the smelting tools (C1) on the top of the working table (C) is limited and which fails to conduct processing in a wider range and in layers.

In view of the mentioned shortcomings, a turning disc intermittent rotary mechanism has been very outstandingly developed and innovated.

SUMMARY OF THE INVENTION

Therefore, the primary objective of the present invention is to provide a turning disc intermittent rotary mechanism to develop the turning disc in rotation to be designed, according to the need, into a processing station with multi braking and dwelling points for providing multi-processing movements.

Another objective of the present invention is to provide a turning disc intermittent rotary mechanism to develop the turning disc by designing and expanding to have multi-layers for enabling a plurality of turning discs rotating in the same direction or reverse directions to each other so as to provide multi-layer processing movements.

Yet another objective of the present invention is to provide a turning disc intermittent rotary mechanism to develop the smelting tool to be possible for directly mounting on the turning disc to facilitate the processing.

For achieving the above objectives, the brief description of the drawings below is followed by the detailed description of the preferred embodiment.

DETAILED DESCRIPTION OF THE PREFERRED EMBODIMENTS

Figure 1:
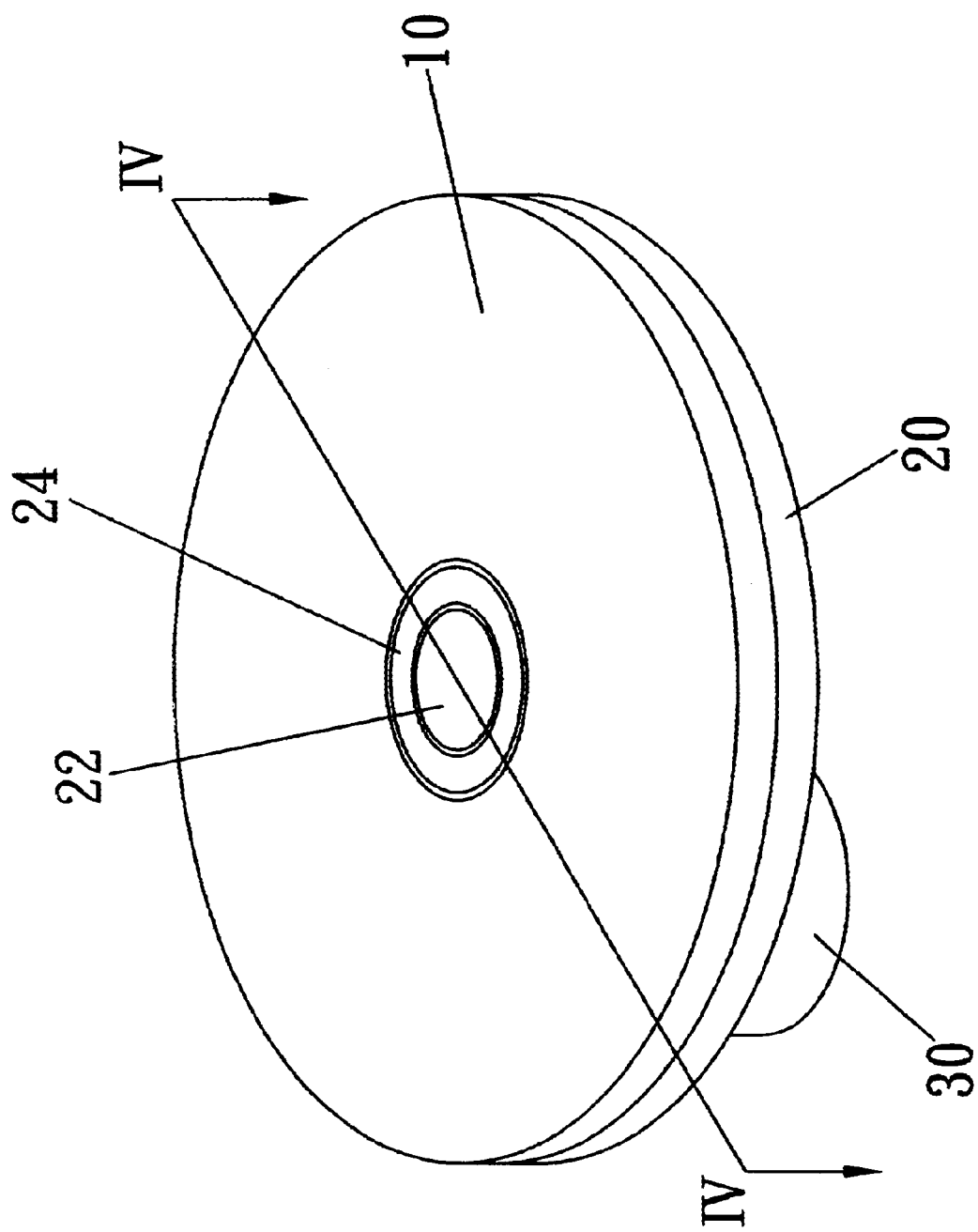
FIG. 1 is a pictorial drawing of the assembled present invention.
Figure 2:
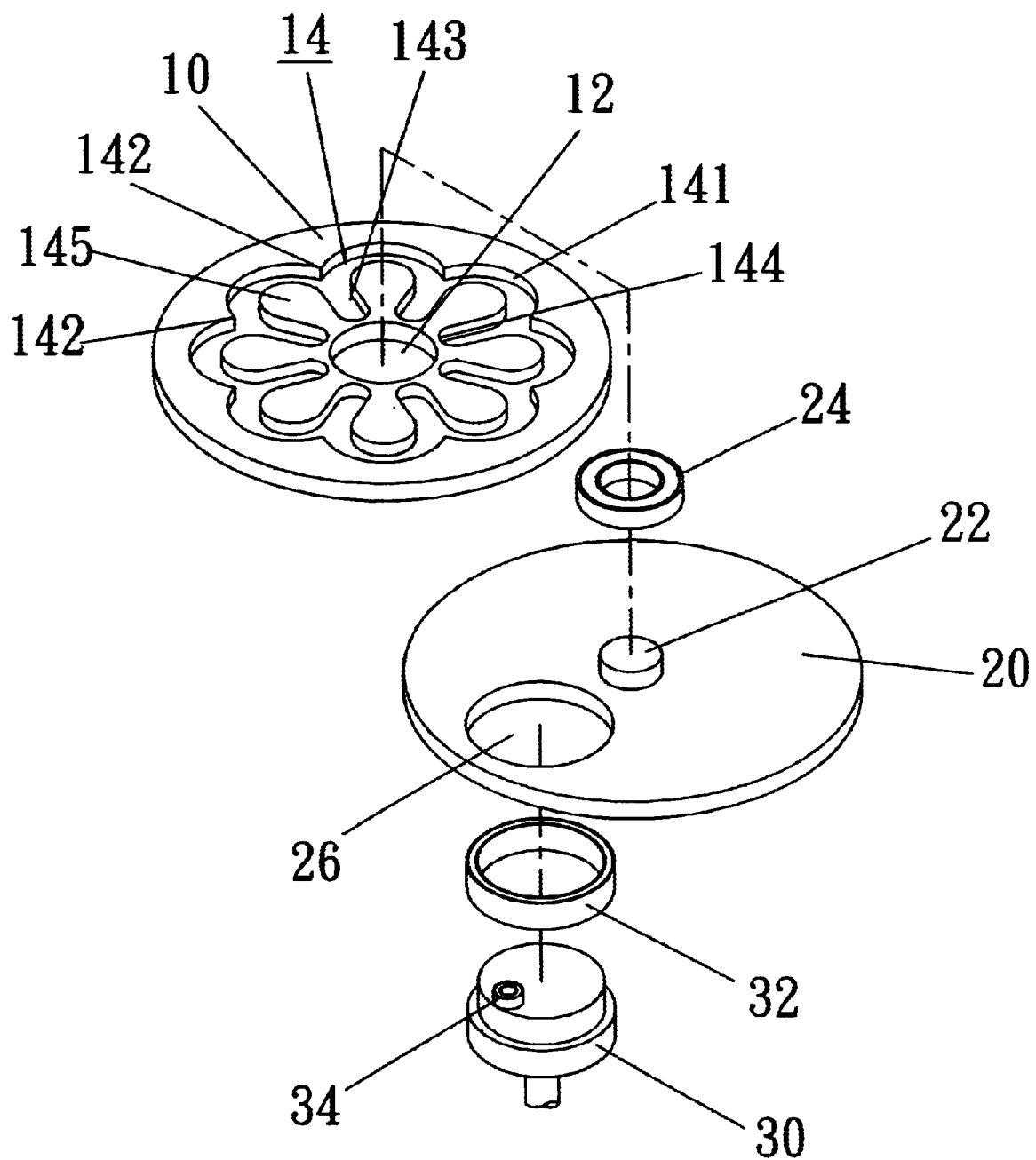
FIG. 2 is a pictorial drawing of the elements of the disassembled present invention.

Referring to FIGS. 1 and 2, the present invention is to provide a turning disc intermittent rotary mechanism, comprising at least one top disc (10) having a through hole (12) disposed at the center of the bottom thereof the lateral side of the through hole (12) defining a plurality of continuous arcuate sliding slots (14); a bottom seat (20) with its central convex section (22) connected in the through hole (12), wherein a round through hole (26) is formed on the side of the bottom seat (20); a main driving wheel (30) inserted in the round through hole (26), wherein a small pulley (34) is mounted on the side of the top plane of the main driving wheel (30), the small pulley (34) slides inside the sliding slots (14); the rotation of the main driving wheel (30) enables the small pulley (34) to move inside the sliding slots (14) and further to drive the intermittent rotation and dwelling of the top disc (10).

According to the primary feature mentioned above, wherein the central convex section (22) of the bottom seat (20) better uses the bearing (24) for lively connecting inside the through hole (12) of the top disc (10), the main driving wheel (30) better uses the bearing (32) for lively connecting inside the round through hole (26).

According to the primary feature mentioned above, wherein the outer wall plane of the sliding slots (14) are continuous and regular arcuate walls (141); a diagonal section (142) is formed between two adjacent arcuate walls (141); a long sliding slot (143) is formed on the corresponding side of the diagonal section (142); an almost semicircular wall (144) is formed on the wall plane of the slot bottom of the long sliding slot (143); a continuous oval convex body (145) is formed on the slot wall plane corresponding to the arcuate wall (141).

Figure 3:
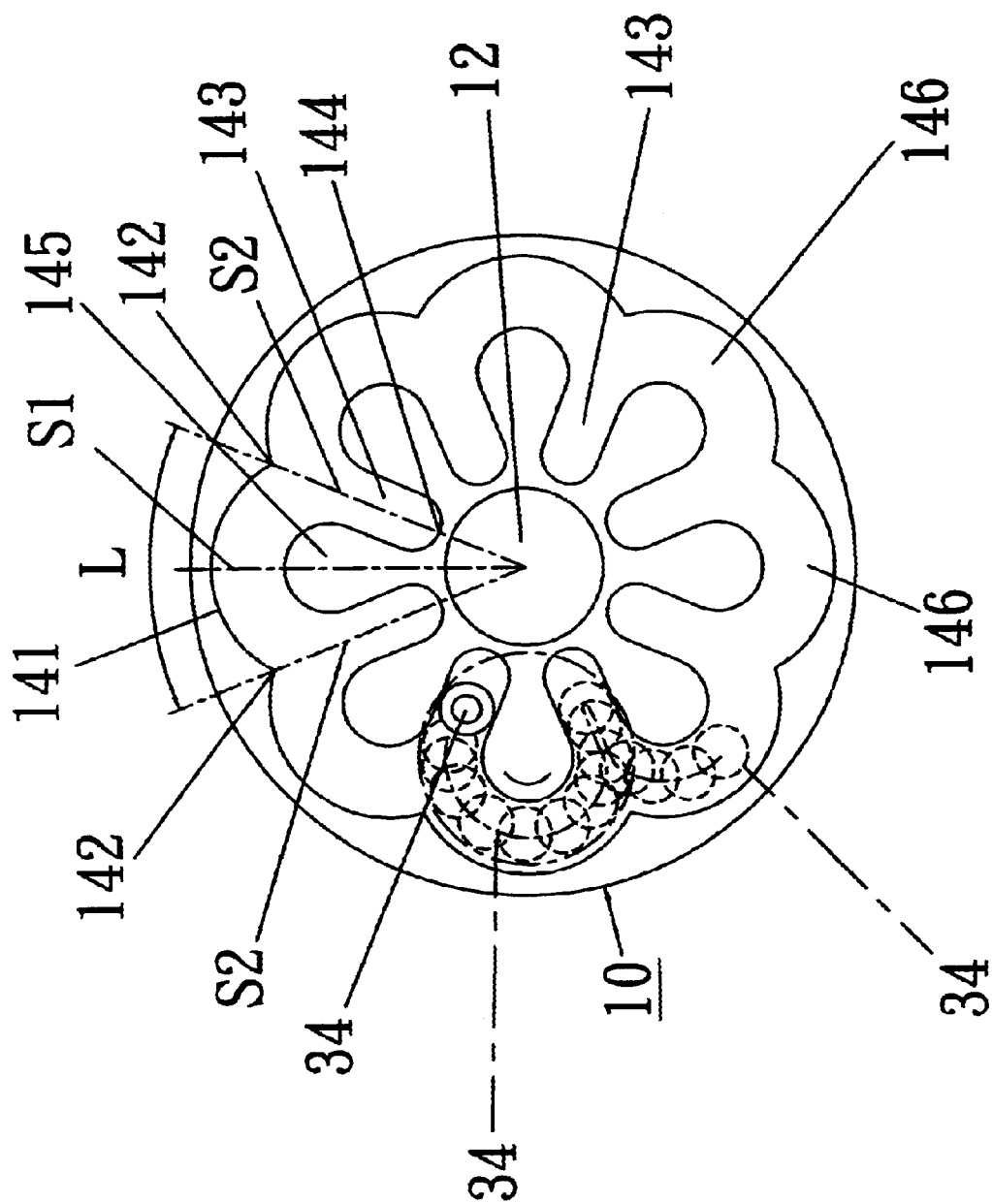
FIG. 3 is a bottom plane drawing of the top disc of the present invention.

According to the primary and secondary features mentioned above, wherein the through hole (12), the arcuate wall (141) and the oval convex body (145) have the same center line (S1) (as shown in FIG. 3); the extending line of the diagonal section (142) and the center lines of both the semi-circular arcuate wall (144) and the through hole (12) share the same center line (S2).

According to the primary and secondary features mentioned above, wherein the sliding slot formed between the oval convex body (145) and the arcuate wall (141) on the corresponding side is an arcuate sliding slot (146); the small pulley (34) sliding inside the arcuate sliding slot (146) is making an idle turning and the top disc (10) does not turn but stays in a dwelling state; when the small pulley (34) slides and moves into the long sliding slot (143), its moment of force will work on the slot wall of the long sliding slot (143) to cause the top disc (10) to rotate.

Figure 5:
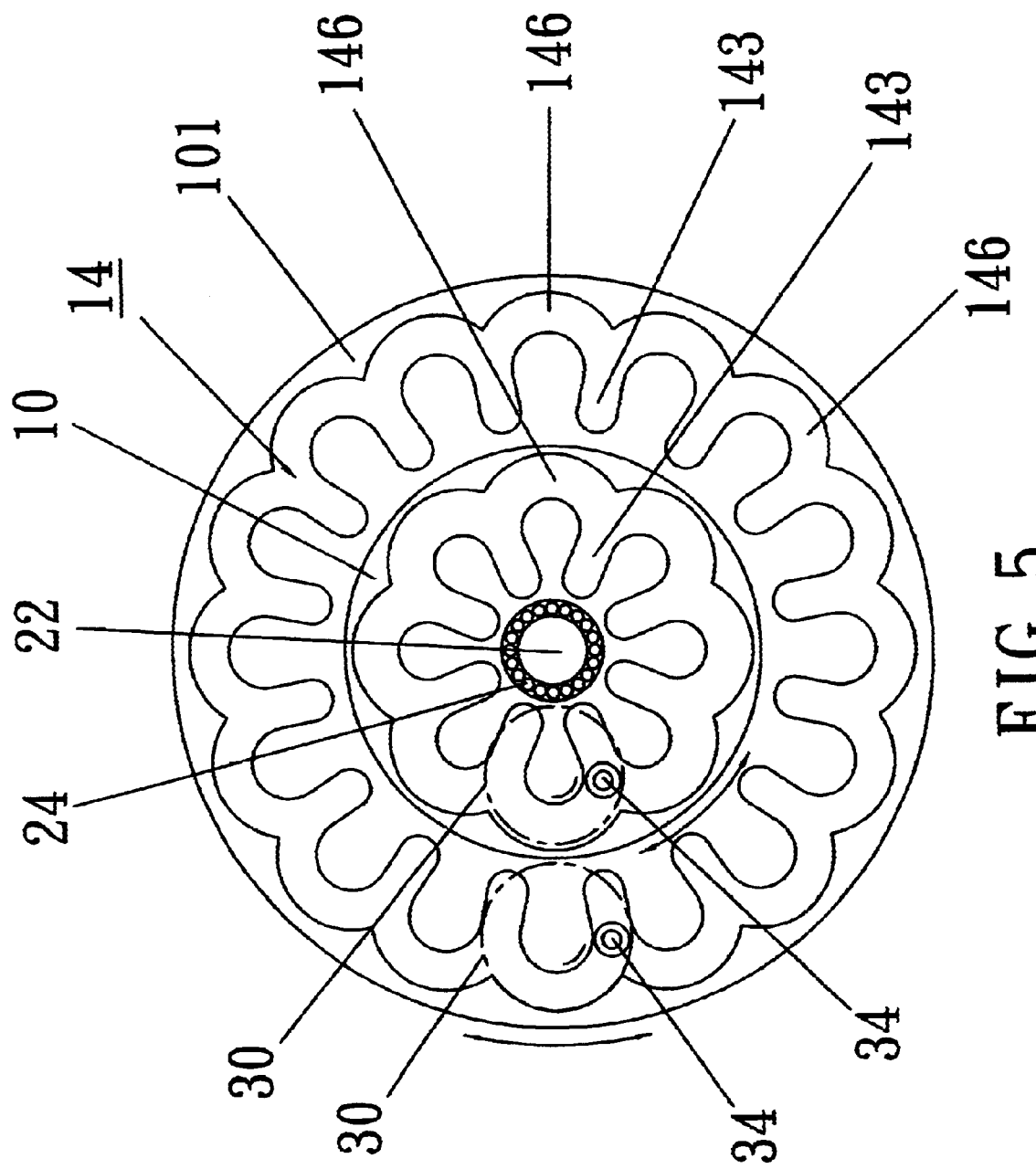
FIG. 5 is a bottom plane view drawing of two inserted top discs of the present invention.
Figure 6A:
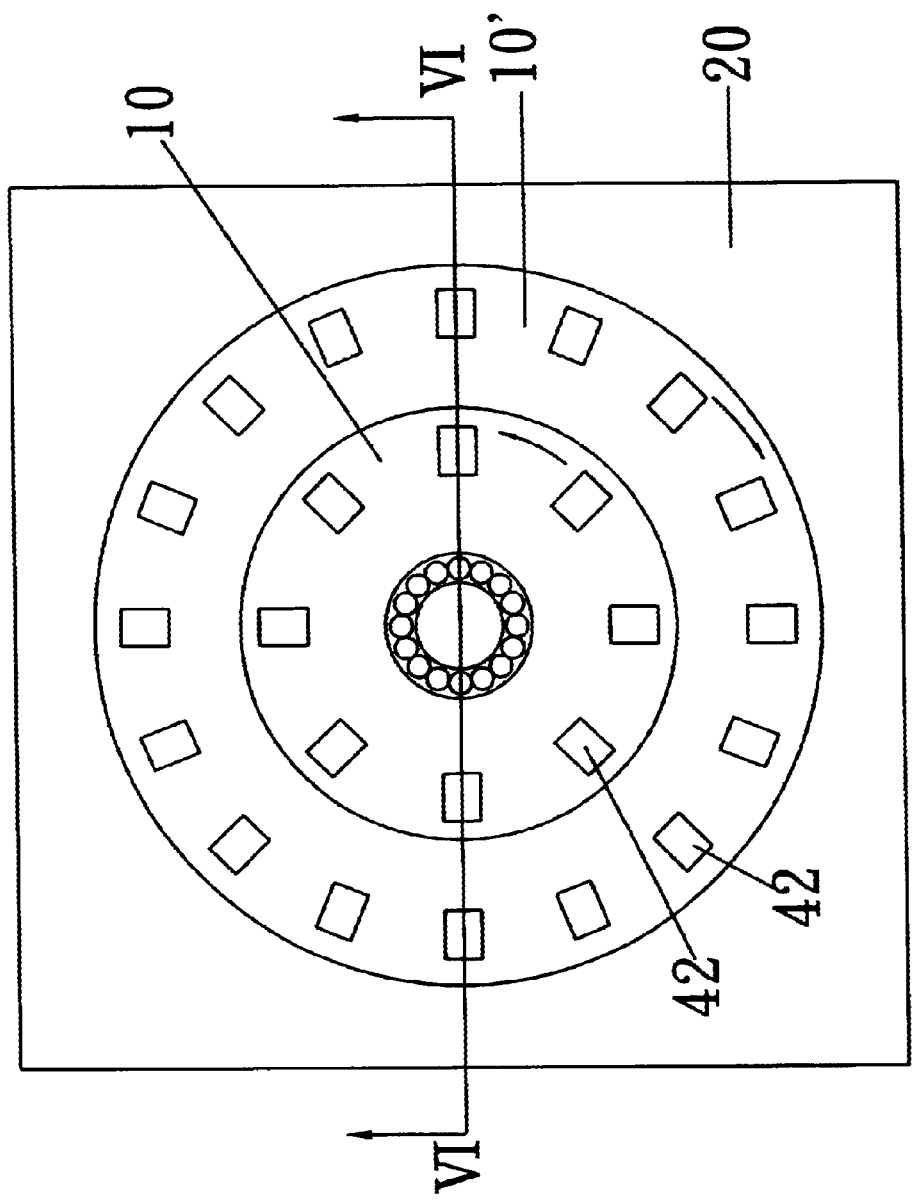
FIG. 6A is a plane view drawing of two top discs installed on the bottom seat of the present invention.
Figure 6B:
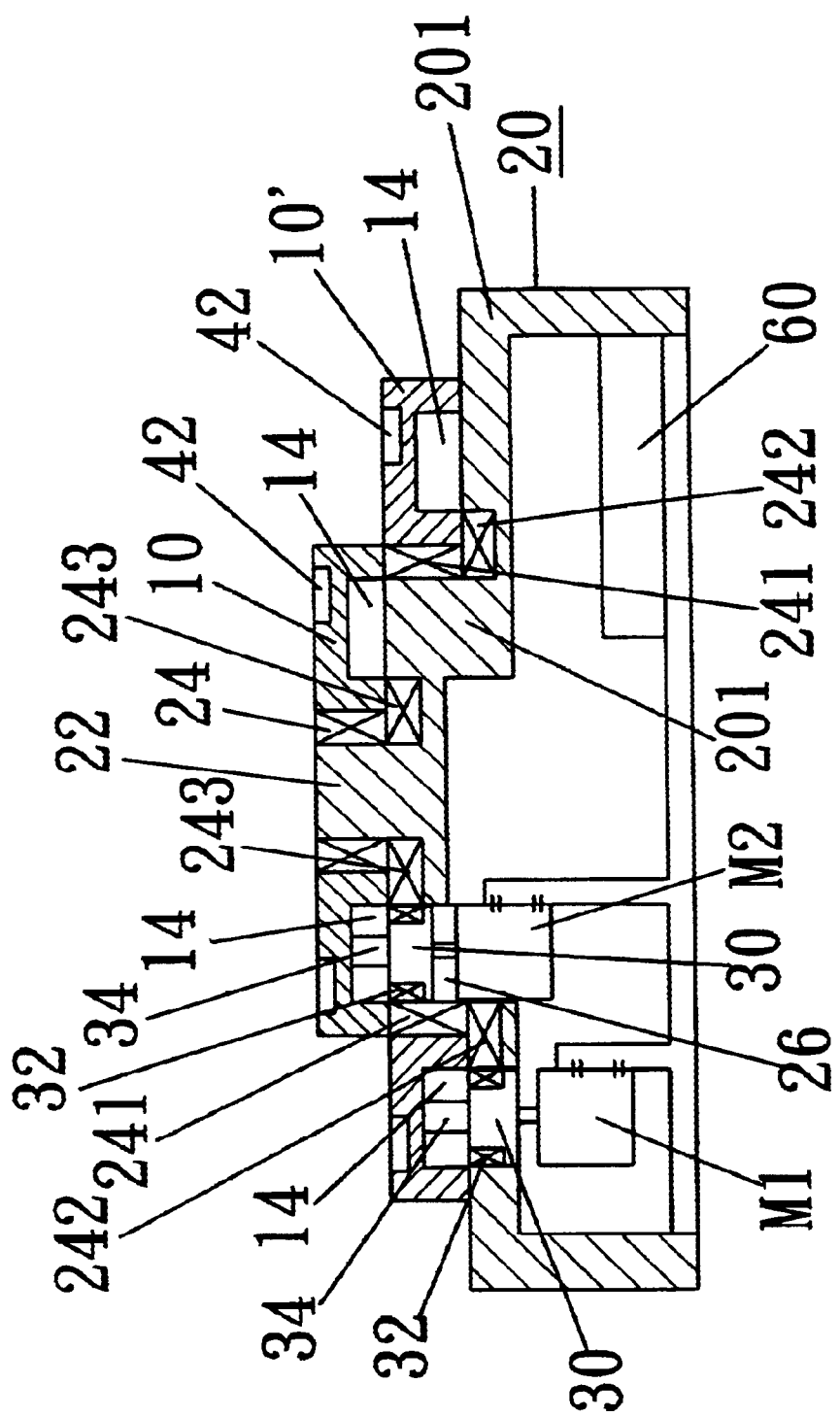
FIG. 6B is a drawing of the cross-section along the VI—VI line of FIG. 6A.
Figure 6C:
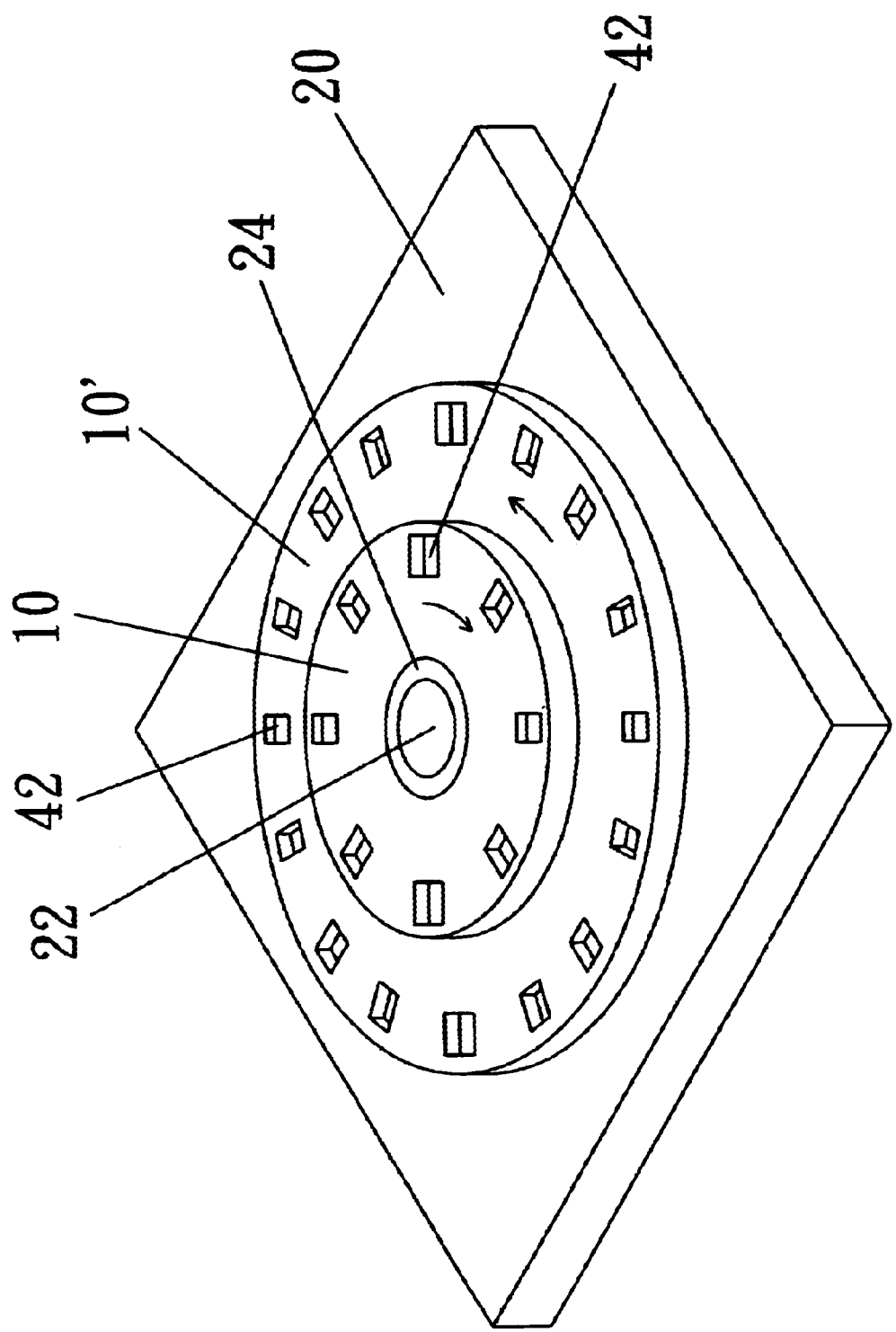
FIG. 6C is a pictorial drawing of FIGS. 6A and 6B.
Figure 7:
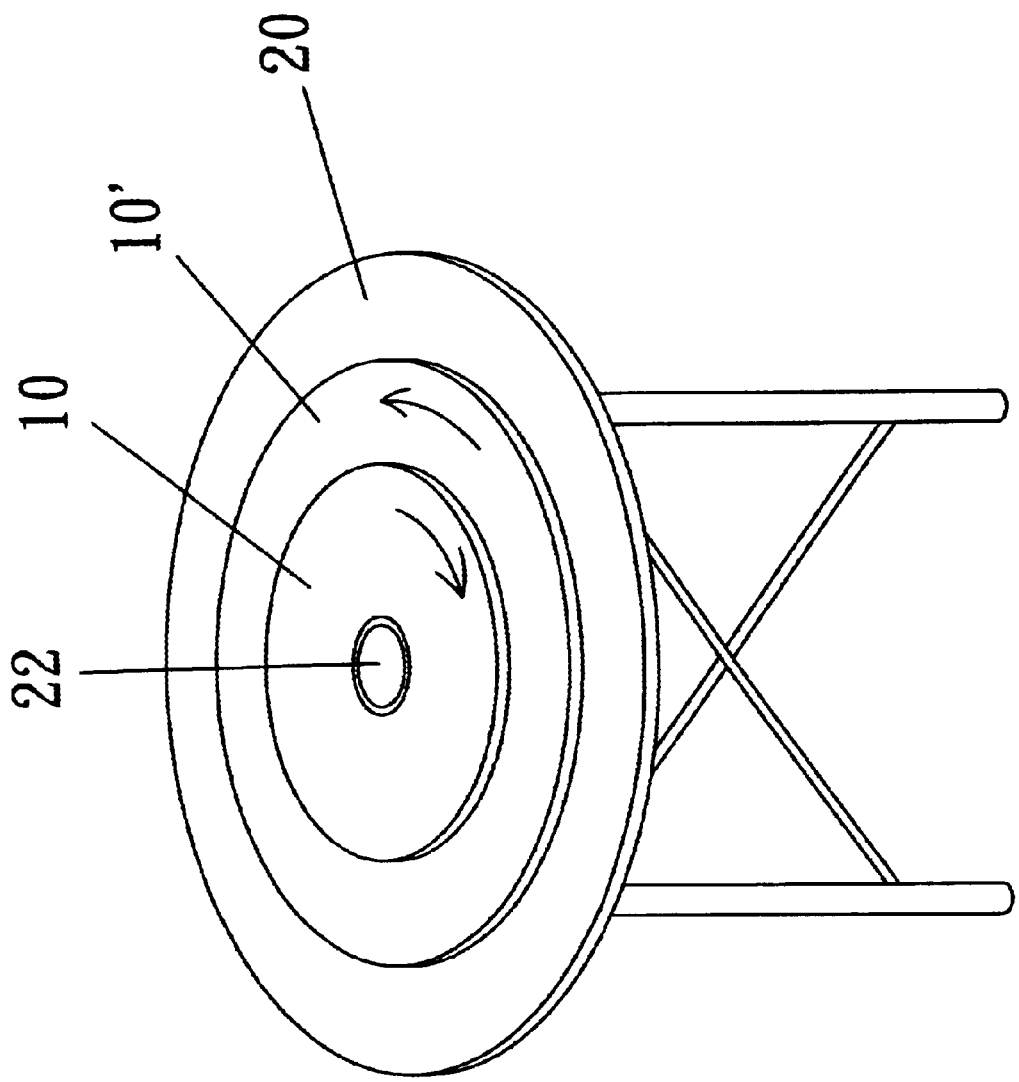
FIG. 7 is a pictorial drawing of the present invention embodied on a dinning table.
Figure 8A:
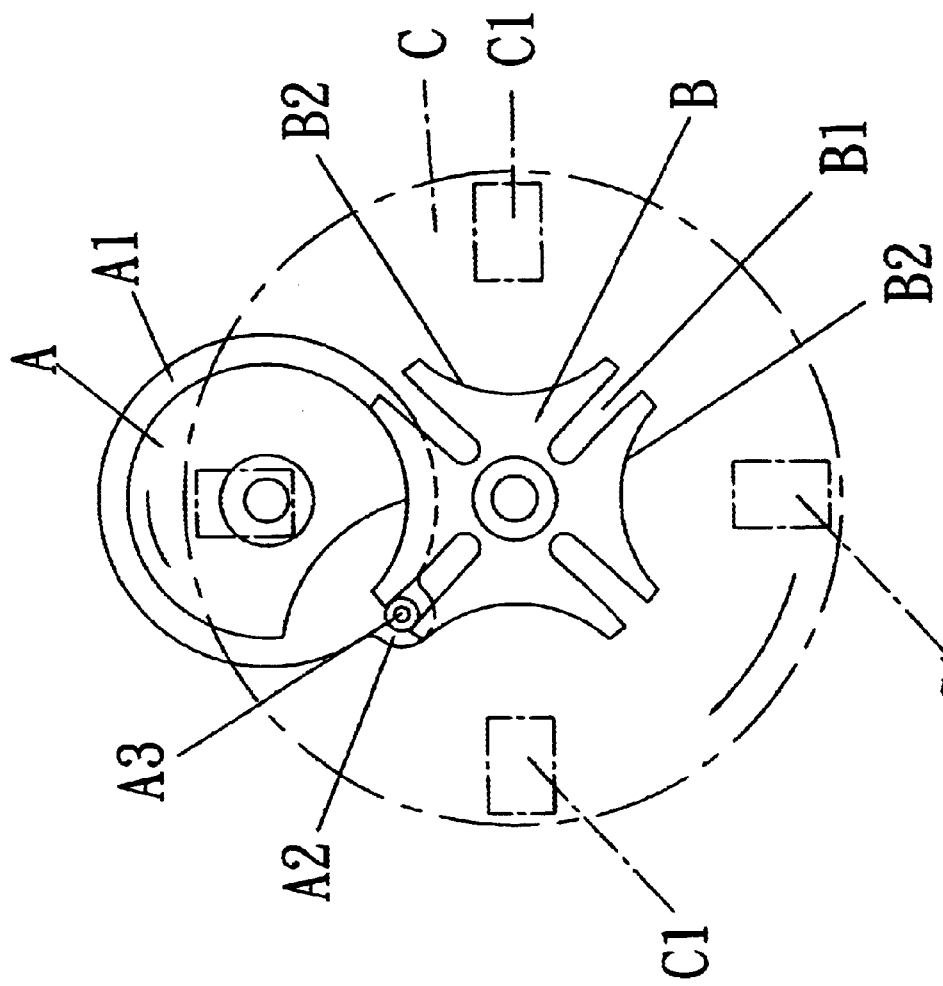
FIGS. 8A–8D are drawings showing the movements of the conventional Geneva turning disc driving mechanism.
Figure 8B:
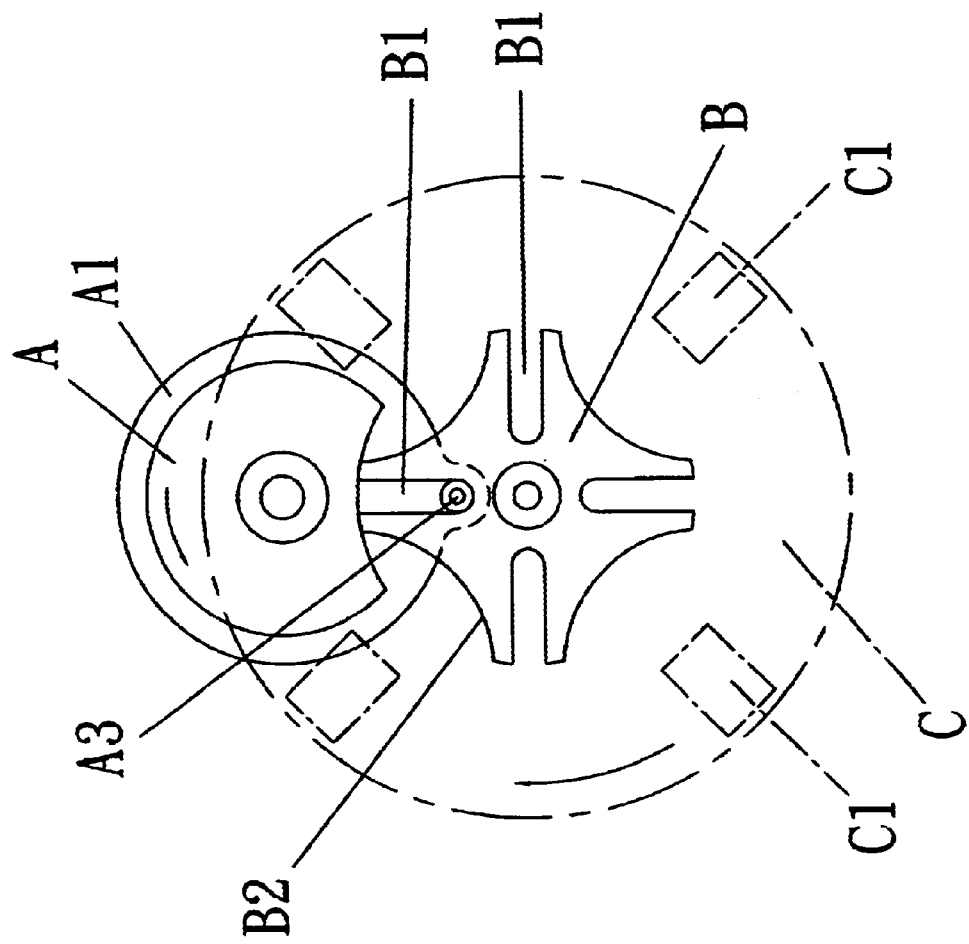
Figure 8C:
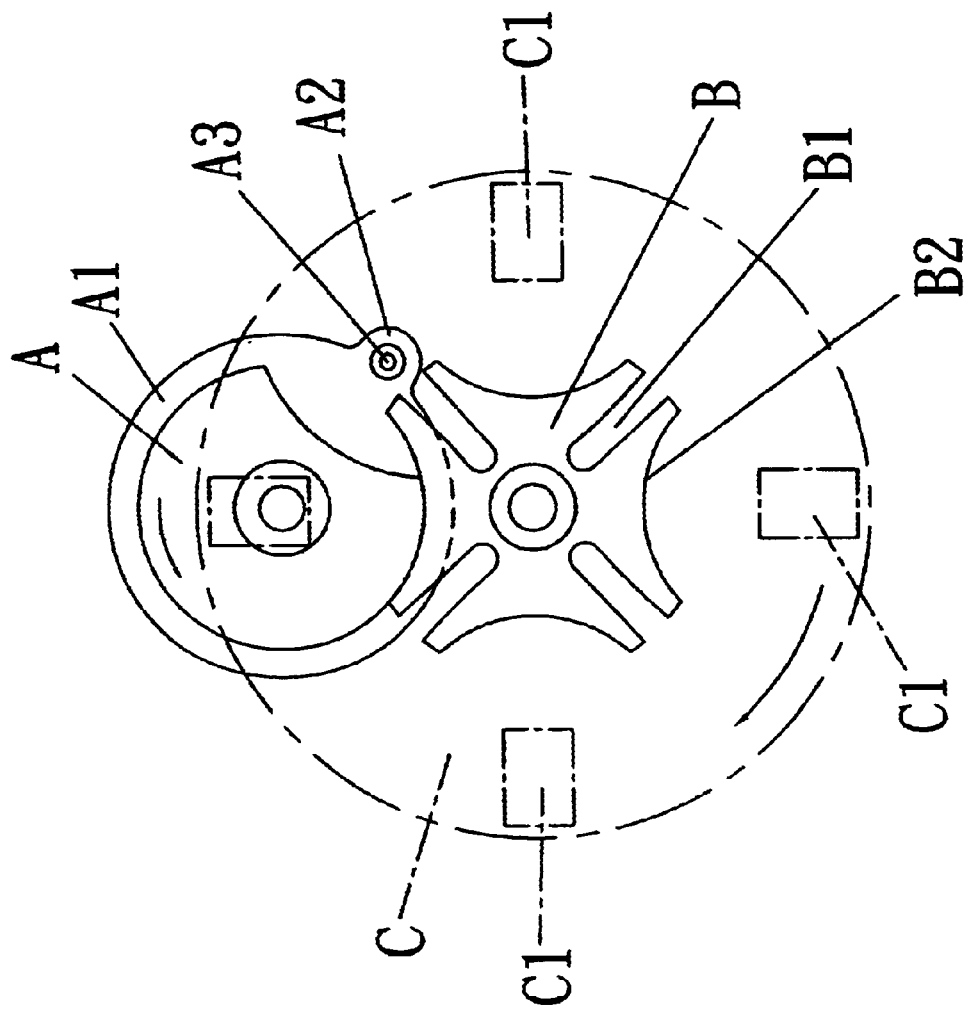
Figure 8D:
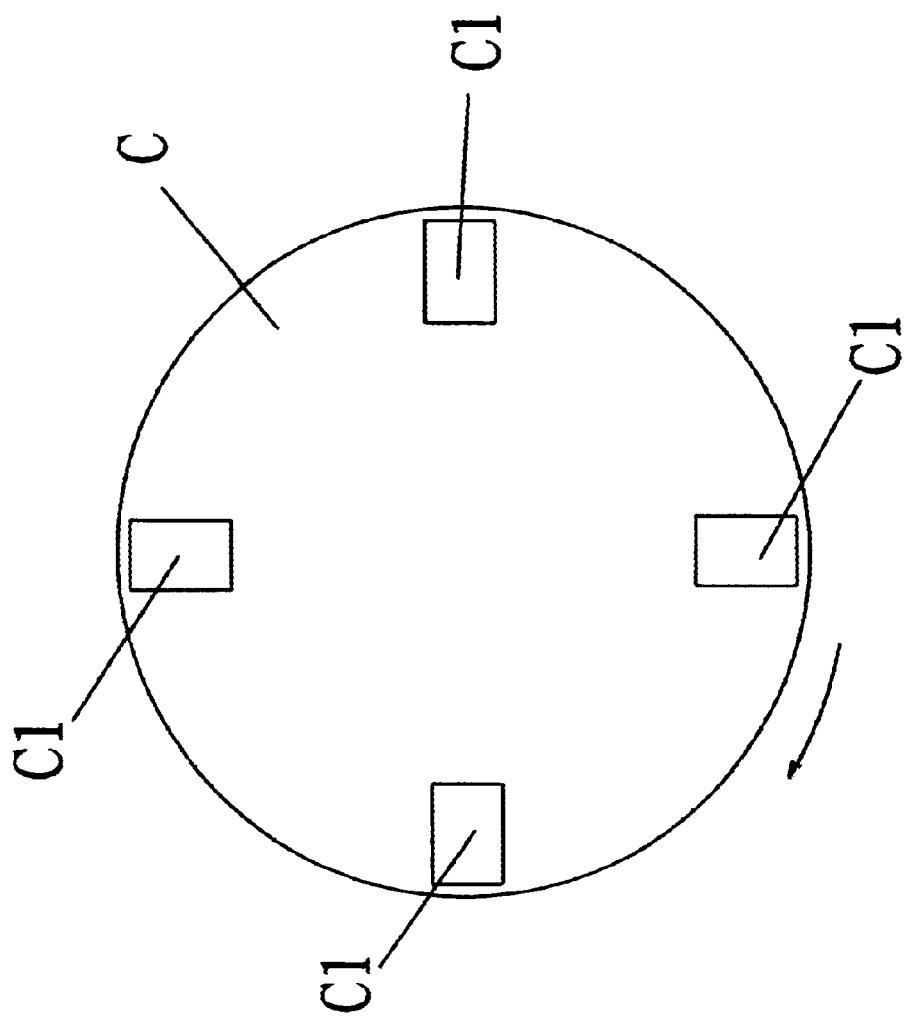
Figure 9:
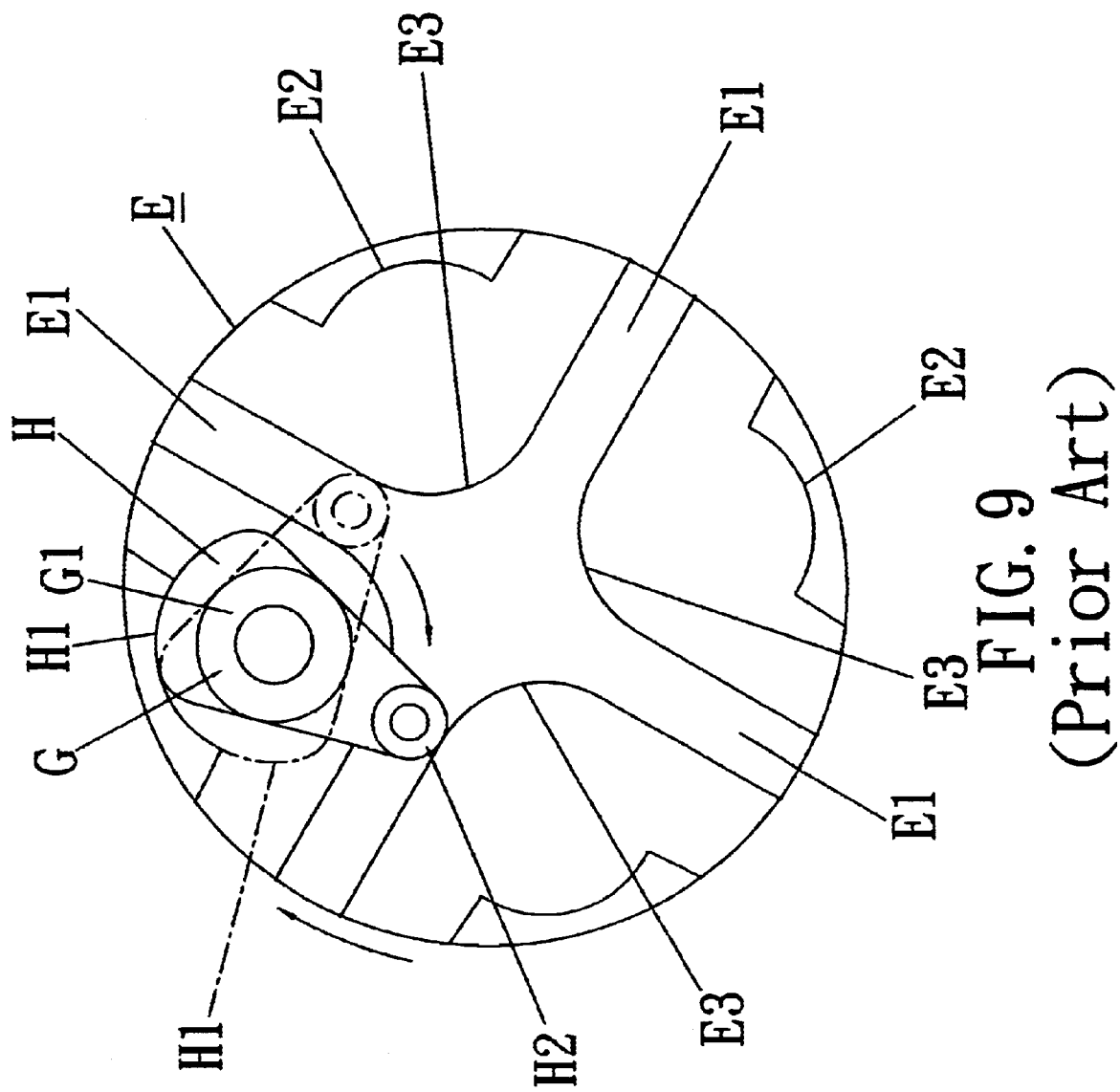
FIG. 9 is a plane drawing of the movement of another conventional turning disc driving mechanism.

According to the primary feature mentioned above, wherein the main driving wheel (30) is driven by the power source (M1); the power source (M1) can control the turning of the main driving wheel (30); when the small pulley (34) slides inside the arcuate sliding slot (146) and the power source (Ml) is controlled to dwell, the small-pulley (34) halts inside the arcuate sliding slot (146) and is in a brake state with regard to the top disc (10) therefore the top disc (10) can't rotate (referring to FIGS. 5 and 6).

According to the primary feature mentioned above, wherein the bottom seat (20) can be inserted with a plurality of layers of top disc (10, 10) according to the need, while the bottom seat (20) can be designed, according to the need, to be a plurality of cylindrical seat bodies (201) with drop in elevation.

Figure 4:
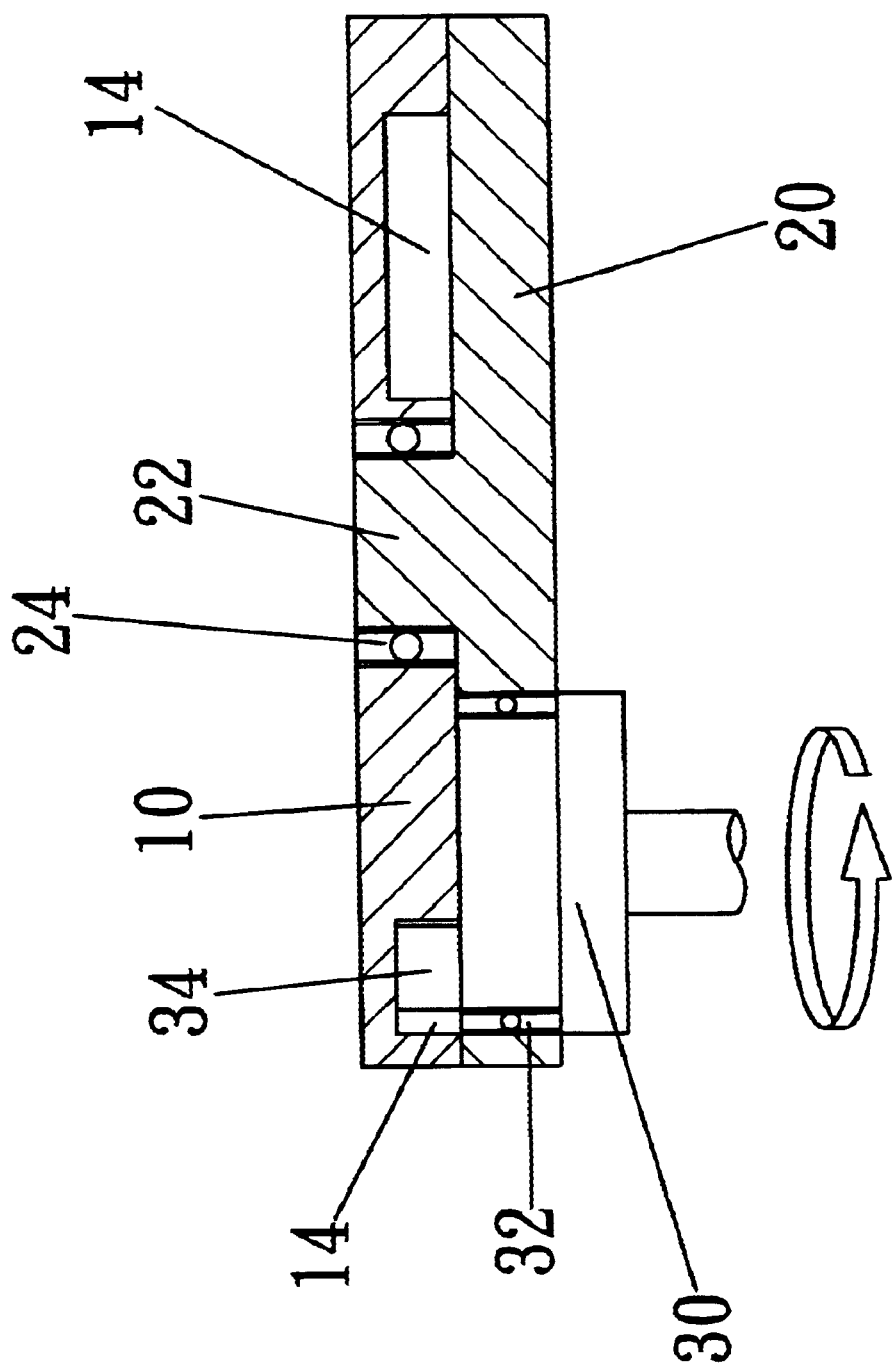
FIG. 4 is a drawing of the cross-section along the IV—IV line of FIG. 1.

According to the achieved primary, secondary features mentioned above, the embodiment possesses the following outstanding efficiency and exemplary embodiment:

1. Referring to FIGS. 3 and 4, driven by the power source (M1), the main driving wheel (30) rotates inside the round through hole (26) and further enables the small pulley (34) to rotate along with the main driving wheel (30); the bottom seat (20) does not move, therefore, the small pulley (34) slides inside the plum blossom-patterned sliding slot (14); referring to FIG. 3, when the small pulley (34) slides inside the arcuate sliding slot (146), the radian of its rotating displacement is the same as that of the arcuate sliding slot (146), therefore, the small (34) will not work on the arcuate wall (141) and the wall plane of the oval convex body (145), the small pulley (34) is making an idle turning, the top disc (10) does not move, the top disc is in a dwelling (not braking) state in terms of moving state; while the small pulley (34) continuously to rotate and displace, it slides into the long sliding slot (143), produces the pushing squeezing and pressing function of the moment of force to one side wall plane of the long sliding slot (143) and further enable the top disc (10) to turn along with it; when the small pulley (34) continuously rotates and leaves the long sliding slot (143) and enters into another arcuate sliding slot (146), it causes another dwelling state; the dwelling time is relative to the arcuate extending length (L) of the arcuate wall (141); the longer the extending length is, the longer the dwelling time is; the longer the length of the long sliding slot (143) is, the longer the work and the staying time of the small pulley (34) in the long sliding slot (143) is, in other words, the longer the top disc (10) rotates; referring to FIGS. 6A, B and C, the causing of the braking state is done by controlling the dwelled rotation time and the starting time of the motors (M1, M2) through the programmable controller (60), so that the dwelling time of the small pulley (34) inside the arcuate sliding slot (146) can be controlled; when the small pulley (34) halts inside the arcuate sliding slot (146), it will make the top disc (10) incapable of displacing or rotating but into a braking state; when one of the object to be processed (not shown in Figure) on the top disc (10) has been processed, the programmable controller (60) orders the motors (M1, M2) to drive again and eliminate the braking sate, therefore the main diving wheel (30) rotates, the small pulley (34) gradually leaves the arcuate sliding slot (146) and enters into another long sliding slot (143); when the small pulley (34) enters the long sliding slot (143) and enables the top disc (10) to rotate another angle to prepare for the next dwelling and braking 2. Referring to FIGS. 5 and 6 of the preferred embodiment of the present invention installed and assembled with two layers of top discs (10, 10') and one bottom seat (20); two layers, a higher and a lower, of top discs (10, 10') are erected respectively on the bottom seat (20), wherein a bearing (241) is mounted on the lateral lower side of the top disc (10), a bearing (242) is also mounted on the lateral lower side of the top disc (10') on the lower layer, and a bearing (243) is pre-embedded on the lower side of the bearing (24) to facilitate both the two top discs (10, 10') to conduct smooth rotation; the power source (M1, M2) can be designed to rotate in the same direction or in the reverse directions; through the movement of the small pulley (34) inside the sliding slot (14), the two top discs (10, 10') can further rotate intermittently in the same direction or in reverse directions. The power source (motors) (M1, M2) can be controlled by the programmable controller (60) for controlling the length of the dwelling time of the small pulley (34) inside the arcuate sliding slot (146); just as mentioned above, the longer the small pulley (34) dwells inside the arcuate sliding slot (146), the longer the braking time of the top discs (10, 10') is; it is obvious that the dwelling time of the top discs (10, 10') can also be controlled by the programmable circuit; what worthy of mention is that the design of selecting the rotating direction and the setting of the braking time of the top discs (10, 10) depends on the need of the working environment; especially, both the top planes of the top discs (10, 10') can be designed to have smelting tools (42) allowing other mechanisms to conduct procession on the object to be processed placed on the smelting tools (42), such as printing multi-layers of colors, filling capsule medicines, filling different materials, etc. Since the plum blossom-patterned sliding slots (14) are precisely Milled and accurate in controlling the braking and dwelling time and position, therefore extremely possesses the value of industrial application.

3. Another embodiment of the present invention, the present invention can be embodied on a dinning table; the bottom seat (20) can be used as the unmovable table top for placing the dinning utensils; the top discs (10, 10') of the first and the second layers can be used for placing the plates and others; the rotation of the top discs (10, 10'), more exactly, the intermittent rotation, can further enable every user to conveniently select one of the plates without the happening of any mal-operation.

In summation of the foregoing sections, the objectives of the invention feature have been achieved completely and the present invention is hereby submitted to the patent bureau for review and the granting of the commensurate patent rights.

What is claimed is:

1. A turning disc intermittent rotary mechanism comprising:

a) a seat;

b) at least one rotatable disc mounted on the seat, the at least one rotatable disc having a surface with a cam groove therein, the cam groove including a plurality of radially extending, elongated sliding slots, each having an inner, semi-circular end and an outer end, and a plurality of arcuate sliding slots connecting the outer ends of adjacent elongated sliding slots, adjacent arcuate sliding slots forming a cusp therebetween, the cusps being aligned with the elongated sliding slots; and, c) at least one main driving wheel having an eccentrically mounted pulley engaging the cam groove such that the rotation of the at least one main driving wheel causes the pulley to move in a circular path having a curvature identical to a curvature of the arcuate sliding slots whereby rotation of the at least one main driving wheel causes intermittent rotation of the at least one rotatable disc.

2. The turning disc intermittent rotary mechanism of claim 1 further comprising a plurality of rotatable discs mounted on the seat, and a plurality of main driving wheels, each main driving wheel intermittently rotating one of the plurality of rotatable discs.

3. The turning disc intermittent rotary mechanism of claim 2 wherein the plurality of rotatable discs are concentric.

4. The turning disc intermittent rotary mechanism of claim 3 wherein each of the plurality of rotatable discs has a work station surface and wherein the work surfaces are located at different heights.

* * * * *